(12) United States Patent  
Van Otten et al.

(10) Patent No.: US 10,014,819 B2  
(45) Date of Patent: Jul. 3, 2018

(54) SOLAR PANEL MOUNTING SYSTEM WITH ADJUSTMENT FEATURES

(71) Applicant: Precision Tech Welding & Machine Inc., Sandy, UT (US)

(72) Inventors: Terry Roderick Van Otten, Sandy, UT (US); Rick Swenson, West Jordan, UT (US)

(73) Assignee: Precision Tech Welding & Machine, Inc., Sandy, UT (US)

( * ) Notice: Subject to any disclaimer, the term of this patent is extended or adjusted under 35 U.S.C. 154(b) by 0 days.

(21) Appl. No.: 15/428,870

(22) Filed: Feb. 9, 2017

(65) Prior Publication Data

US 2017/0229997 A1 Aug. 10, 2017

Related U.S. Application Data

(60) Provisional application No. 62/293,493, filed on Feb. 10, 2016.

(51) Int. Cl.
| | |
|---|---|
| *H02S 20/30* | (2014.01) |
| *H02S 20/23* | (2014.01) |
| *F16M 13/02* | (2006.01) |
| *F16M 11/12* | (2006.01) |

(52) U.S. Cl.  
CPC .............. *H02S 20/30* (2014.12); *F16M 11/12* (2013.01); *F16M 13/022* (2013.01); *H02S 20/23* (2014.12)

(58) Field of Classification Search  
CPC ......... H02S 20/30; H02S 20/23; F16M 11/12; F16M 13/022

USPC ......... 248/181.1, 663, 288.31; 403/114, 115, 403/122, 127, 131; 52/173.3

See application file for complete search history.

(56) References Cited

U.S. PATENT DOCUMENTS

| | | | | |
|---|---|---|---|---|
| 514,669 | A * | 2/1894 | Allingham | F24J 2/12 126/605 |
| 962,246 | A * | 6/1910 | Rockwell | F16F 9/43 267/64.28 |
| 2,496,539 | A * | 2/1950 | Husted | E06C 7/44 182/110 |
| 3,288,421 | A * | 11/1966 | Peterson | B23Q 1/5462 108/4 |
| 3,577,659 | A * | 5/1971 | Kail | B25J 17/0216 248/163.1 |
| 4,165,853 | A | 8/1979 | Brandt | |
| 4,269,173 | A * | 5/1981 | Krueger | F24J 2/4636 126/569 |
| 4,360,284 | A * | 11/1982 | Brandenburg | F16C 11/0614 29/511 |
| 4,371,139 | A | 2/1983 | Clark | |
| 4,482,122 | A | 11/1984 | Grashow | |

(Continued)

*Primary Examiner* — Muhammad Ijaz  
(74) *Attorney, Agent, or Firm* — Morriss O'Bryant Compagni

(57) ABSTRACT

A mounting system for solar panels that is adjustable to allow for ease of installation. An adjustable leg or strut includes a telescoping portion that is connected to a base by a compound ball joint. At an upper end, an angularly adjustable bracket allows for connection to a rail for supporting the solar panel. In a typical installation, two series of adjustable legs are used to support two rails at differing heights to support a panel in a desired position. The adjustable nature of the components allows for a faster installation compared to known solar panel mounting systems.

19 Claims, 10 Drawing Sheets

(56) References Cited

U.S. PATENT DOCUMENTS

| | | | |
|---|---|---|---|
| 4,989,826 A * | 2/1991 | Johnston, Jr. | F16M 5/00 248/237 |
| 5,056,750 A | 10/1991 | Ellithorpe | |
| 5,603,187 A | 2/1997 | Merrin et al. | |
| 5,672,024 A * | 9/1997 | Maughan | B62D 7/16 403/122 |
| 5,921,698 A * | 7/1999 | Hegen | E06B 3/5436 403/131 |
| 6,360,491 B1 | 3/2002 | Ullman | |
| 6,640,941 B2 * | 11/2003 | Taylor | F16F 9/0209 188/314 |
| D547,262 S | 7/2007 | Ullman | |
| 7,753,330 B2 * | 7/2010 | Brief | B60R 11/0241 248/278.1 |
| 8,167,258 B1 | 5/2012 | Wentworth et al. | |
| 8,266,846 B2 * | 9/2012 | Schoell | F24J 2/045 126/621 |
| 8,777,176 B2 | 7/2014 | Genschorek | |
| 8,938,932 B1 | 1/2015 | Wentworth et al. | |
| 9,057,542 B2 | 6/2015 | Schuit et al. | |
| 2003/0177706 A1 * | 9/2003 | Ullman | E04D 13/12 52/3 |
| 2009/0272866 A1 * | 11/2009 | Solomovitz Brief | B60R 11/0241 248/276.1 |
| 2009/0293941 A1 * | 12/2009 | Luch | H01L 31/02008 136/251 |
| 2010/0175337 A1 | 7/2010 | Mascolo et al. | |
| 2010/0232869 A1 * | 9/2010 | Ditzler | E02F 9/006 403/122 |
| 2011/0024582 A1 * | 2/2011 | Gies | F24J 2/5239 248/122.1 |
| 2012/0222380 A1 * | 9/2012 | Wentworth | E04D 13/1407 52/698 |
| 2012/0223032 A1 | 9/2012 | Rothschild et al. | |
| 2013/0086852 A1 * | 4/2013 | Tweedie | F24J 2/5203 52/173.3 |
| 2013/0091692 A1 * | 4/2013 | Stanley | F16M 13/022 29/525.15 |
| 2014/0318045 A1 * | 10/2014 | Gezelman | H02S 20/23 52/173.3 |
| 2015/0168021 A1 | 6/2015 | Wentworth et al. | |
| 2016/0069592 A1 * | 3/2016 | Giraudo | H02S 20/23 126/704 |
| 2016/0111835 A1 * | 4/2016 | Nayar | H01R 25/142 439/122 |
| 2017/0229997 A1 * | 8/2017 | Van Otten | H02S 20/30 |

* cited by examiner

SOLAR PANEL MOUNTING SYSTEM WITH ADJUSTMENT FEATURES

CROSS-REFERENCE TO RELATED APPLICATION

This application claims the benefit of U.S. Provisional Application No. 62/293,493, filed Feb. 10, 2016, the disclosure of which is incorporated herein by reference in its entirety.

TECHNICAL FIELD

This invention relates to mounting systems for solar panels.

BACKGROUND

Solar panel usage has been experiencing rapid growth as an industry and the installation of solar panels on existing buildings has been rapidly increasing. For a typical commercial building with a flat or curved roof, this requires a mounting system for attaching the panels to the roof at a desired angle. While more expensive systems may use active mountings that track the movement of the sun during the day, a more typical installation positions the panels at an angle that provides the best average exposure to the sun, often based on the latitude of the installation. For a typical commercial building installation, either a series of poles or rods are mounted to a roof with rails attached to the tops thereof, or a specialized angled track system is attached.

With either type of system, typically multiple days and visits to the installation site are required for installation as the components need to be measured onsite, then cut and assembled, either onsite or at a shop location in order to avoid disturbing building occupants. The inevitable miscut pieces can result in additional visits and time required, or in waste of materials, or both.

A solar panel support system that used adjustable components and allowed for faster installation with reduced material waste would be an improvement in the art.

SUMMARY

The present disclosure is directed to a mounting system for solar panels that is adjustable to allow for ease of installation. An adjustable leg or strut includes a telescoping portion that is connected to a base by a compound ball joint. At an upper end, an angularly adjustable bracket allows for connection to a rail for supporting the solar panel. In a typical installation, two series of adjustable legs are used to support two rails at differing heights to support a panel in a desired position. The adjustable nature of the components allows for a faster installation compared to known solar panel mounting systems.

DESCRIPTION OF THE DRAWINGS

It will be appreciated by those of ordinary skill in the art that the various drawings are for illustrative purposes only. The nature of the present disclosure, as well as other embodiments in accordance with this disclosure, may be more clearly understood by reference to the following detailed description, to the appended claims, and to the several drawings.

DETAILED DESCRIPTION

The present disclosure relates to apparatus, systems and methods for mounting solar panels. It will be appreciated by those skilled in the art that the embodiments herein described, while illustrative, are not intended to so limit this disclosure or the scope of the appended claims. Those skilled in the art will also understand that various combinations or modifications of the embodiments presented herein can be made without departing from the scope of this disclosure. All such alternate embodiments are within the scope of the present disclosure.

Figure 1:
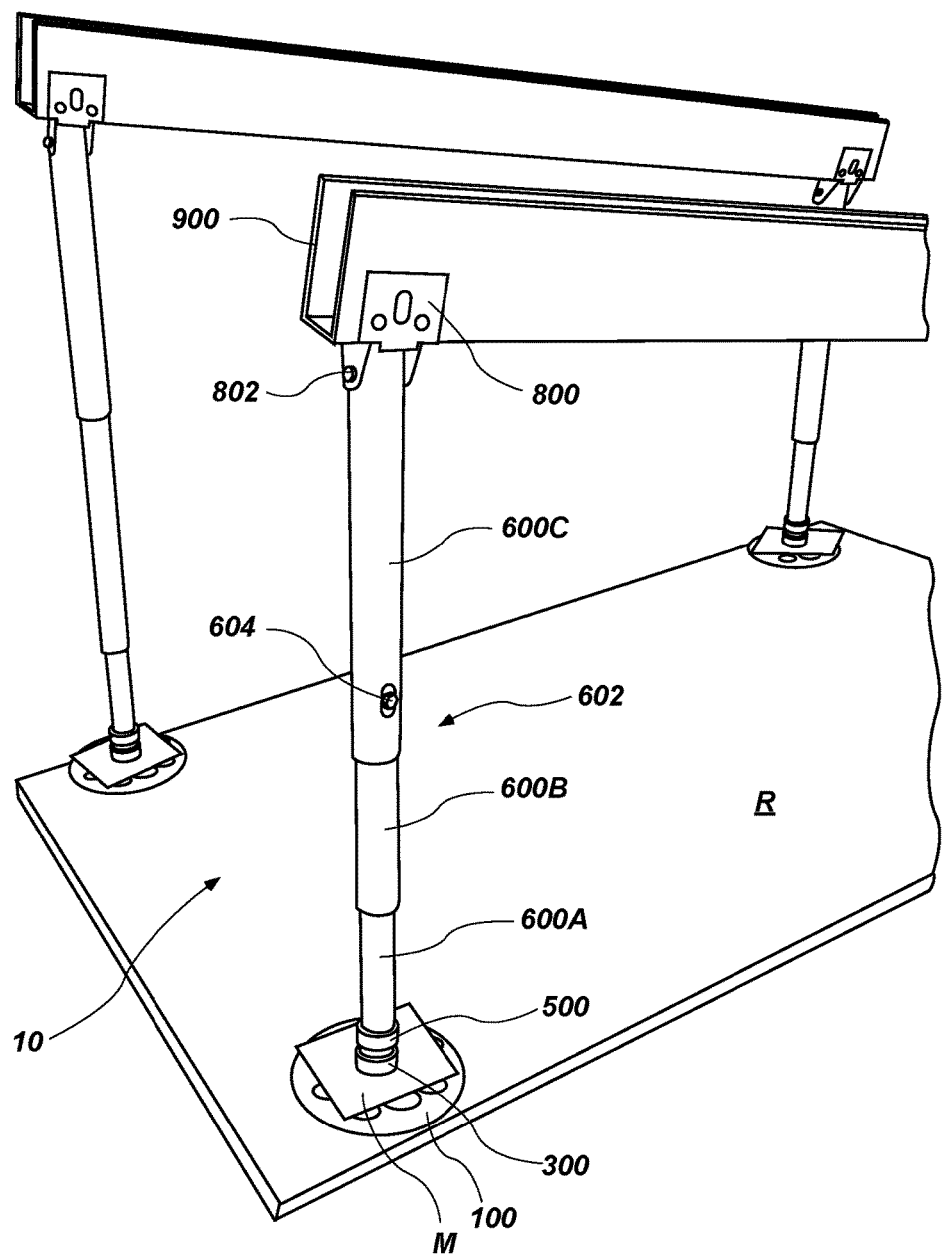
FIG. 1 depicts a partial perspective view of a solar panel installation system in accordance with the present disclosure.

Turning to FIG. 1, a first embodiment of system 10 for mounting a solar panel in accordance with this disclosure is depicted. As depicted, the system typically includes a number of components that are assembled to manufacture the complete system. As depicted in FIG. 1, the visible components after installation may include a base 100, a lower knuckle 300, and upper knuckle 500, a series of telescoping tubes 600A, 600B and 600C, and an upper bracket 800. A rail 900 for use with the system is also depicted.

Figures 2A, 2B, 2C:
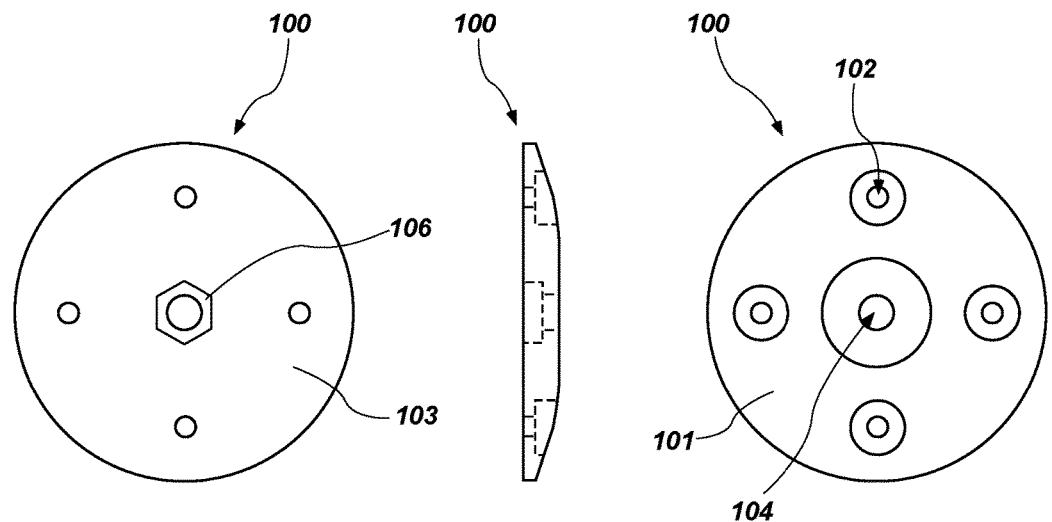
FIGS. 2A, 2B and 2C are top, side and bottom views of a first embodiment of a puck or base for installing the system of FIG. 1.

Turning to FIGS. 2A, 2B and 2C, the base or puck 100 is depicted in more detail. For installation on a flat or domed roof, the puck 100 may have a generally planar lower surface 103 and an upper surface 101, which may be curved or domed. A series of connection ports, 102 may be formed as holes passing through the base 100, which may be recessed at the upper surface 101. These allow for screws or bolts to be used to fasten the puck to the roof, or an underlying structure, such as a beam supporting the roof. A seat 104 for a radius bolt 200 may be formed as an additional hole 106 passing through the puck 100 from the lower surface 103 to the upper surface 101, which may include a recess 106 at the lower surface 203 that is configured to accept and retain the head of the radius bolt 200.

In the depicted embodiment, the seat 104 is formed as a polygonal recess that may correspond to the head of the radius bolt 200 with an internal shelf before the round hole 106 that allows the shaft of the radius bolt 200 to pass therethrough. It will be appreciated that any suitable shape for the radius bolt head may be used, including polygonal, rounded and ellipsoid shapes. In some embodiments, the seat 104 may have ridges or be knurled to prevent the radius bolt 200 head from rotating therein.

Figures 3A, 3B, 3C:
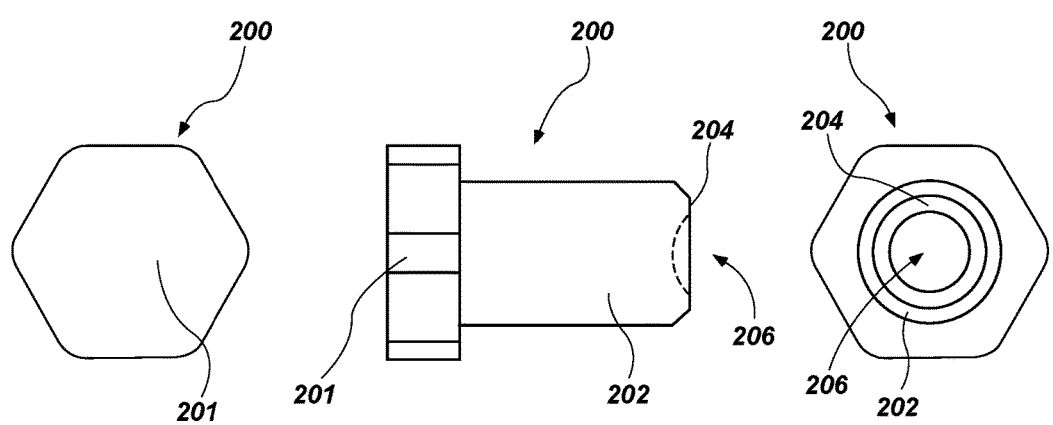
FIGS. 3A, 3B, and 3C are bottom, side and top views of a radius bolt for installing the system of FIGS. 2A, 2B and 2C.
Figure 5B:
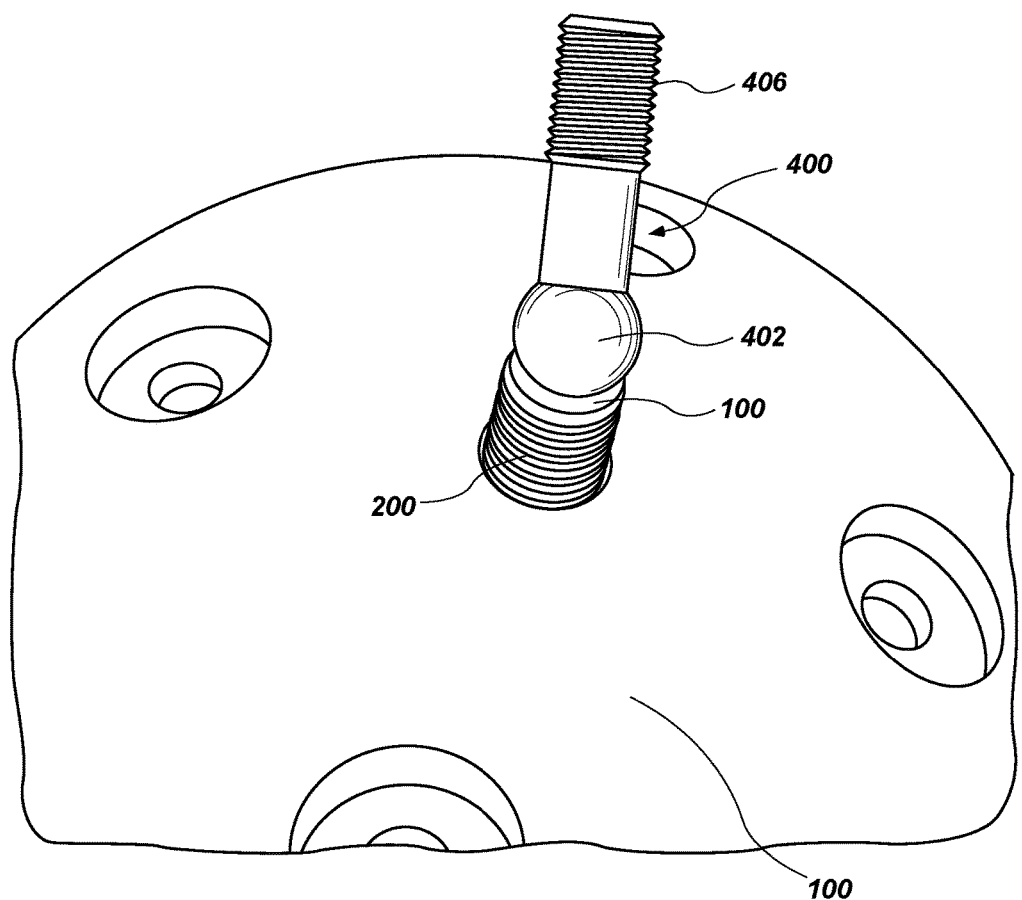
FIG. 5B is a perspective view of the components of FIGS. 1, 2A-2C and 3A-4 illustrating the position of these to one another.

A radius bolt 200 is depicted in FIGS. 3A, 3B and 3C as a member with a head portion 201, a shaft 202 and an upper face 204. The shaft 202 is typically threaded as depicted in FIG. 5. The upper face 204 may be generally flat with a concave inset 206 formed therein.

Figure 4:
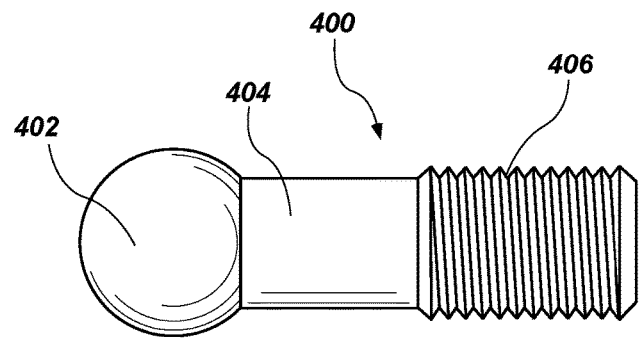
FIG. 4 is a side view of a ball stud for installing the system of FIG. 1.

FIG. 4 depicts a ball stud 400 which includes a ball portion 402 having a rounded profile, attached to a stem portion 404 that extends from the ball portion 402 to a distal end. At least a distal portion of the stem 404 is a connection portion 406 that may be threaded for connection. As depicted in FIG. 5, upon installation, a portion of the ball portion 402 of the ball stud 400 resides in the concave inset 206 of the radius bolt and may be rotated therein to form a ball joint.

Figure 6:
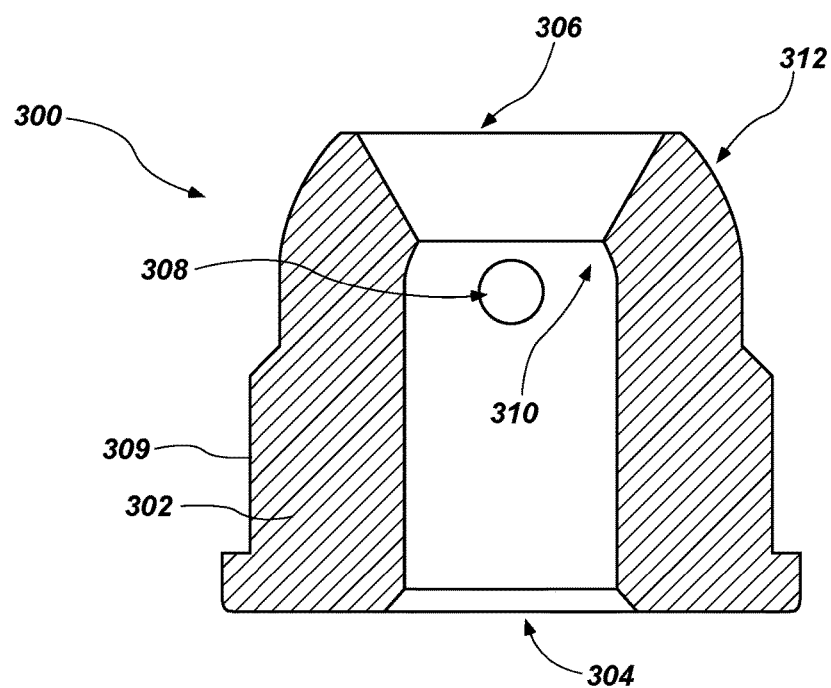
FIG. 6 is a sectional side view of a lower knuckle for installing the system of FIG. 1.

FIG. 6 depicts a lower knuckle member 300 for attachment to the radius bolt 200 and securing the ball stud 400. The lower knuckle 300 may be formed as a generally circular member with a sidewall 302 surrounding a central passage passing from a bottom opening 304 at a lower surface to a top opening 306. The sidewall 302 surface in the lower portion of the central passage may be threaded for rotational attachment to the shaft 202 of the radius bolt 200. At an upper portion of the passage, the sidewalls 302 may have a curved portion 310 that corresponds to the curve of the ball portion 402 of the ball stud 400. The upper opening 306 may have a generally conical shape to allow the stem 404 of the ball stud 400 protruding therethrough to be positioned at a desired angle.

On the outer surface, the sidewall 302 may have a curved upper portion 312 that has a generally circular shape and the lower portion may include one or more flat areas 309 or other structures to allow a tool to grip the lower knuckle member 300 for tightening. Additionally, one or more securing openings 308 may pass through the sidewall in an upper portion to allow for securing of the ball stud 400. The depicted embodiment features two securing openings 308 which are generally lateral and threaded for the insertion of set screws, but it will be appreciated that any suitable number and positioning may be used.

Figure 7:
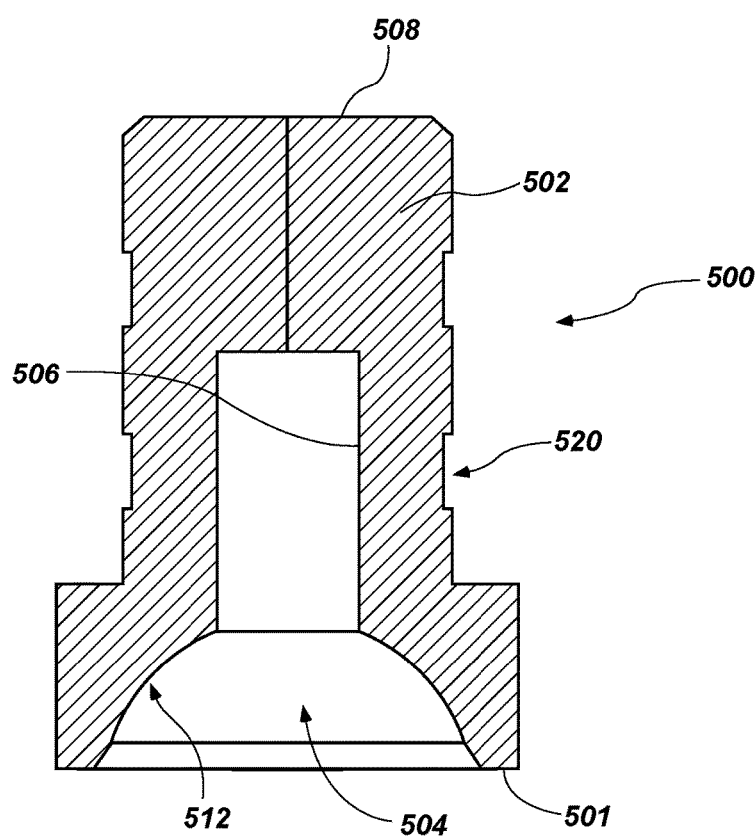
FIG. 7 is a sectional side view of an upper knuckle for installing the system of FIG. 1.

FIG. 7 depicts an upper knuckle member 500 for attachment to the ball stud 400. As depicted, the upper knuckle member 500 may be formed as a generally circular member with a sidewall 502 surrounding a central passage passing from a bottom opening 504 at a lower surface 501 into the body of the member 500 towards a top end 508. As depicted, the top end may be closed. The upper portion of the central passage may include sidewalls 506 which are threaded for attachment to the connection portion of the ball stud stem 404. The portion of the central passage at bottom opening 501 may have curved profile 512 at the sidewalls corresponding to the curved upper portion 302 of the lower knuckle member 300. On an outer surface, the upper knuckle member 500 may include features for attachment to a tube 600. In the depicted embodiment, these are the encircling recesses 520 allowing the tube to be crimped over the narrower upper portion of the member 500. Additionally, one or more flat areas 509 or other structures to allow a tool to grip the upper knuckle member 500 for tightening may be disposed on a lower portion of the member.

Figure 8:
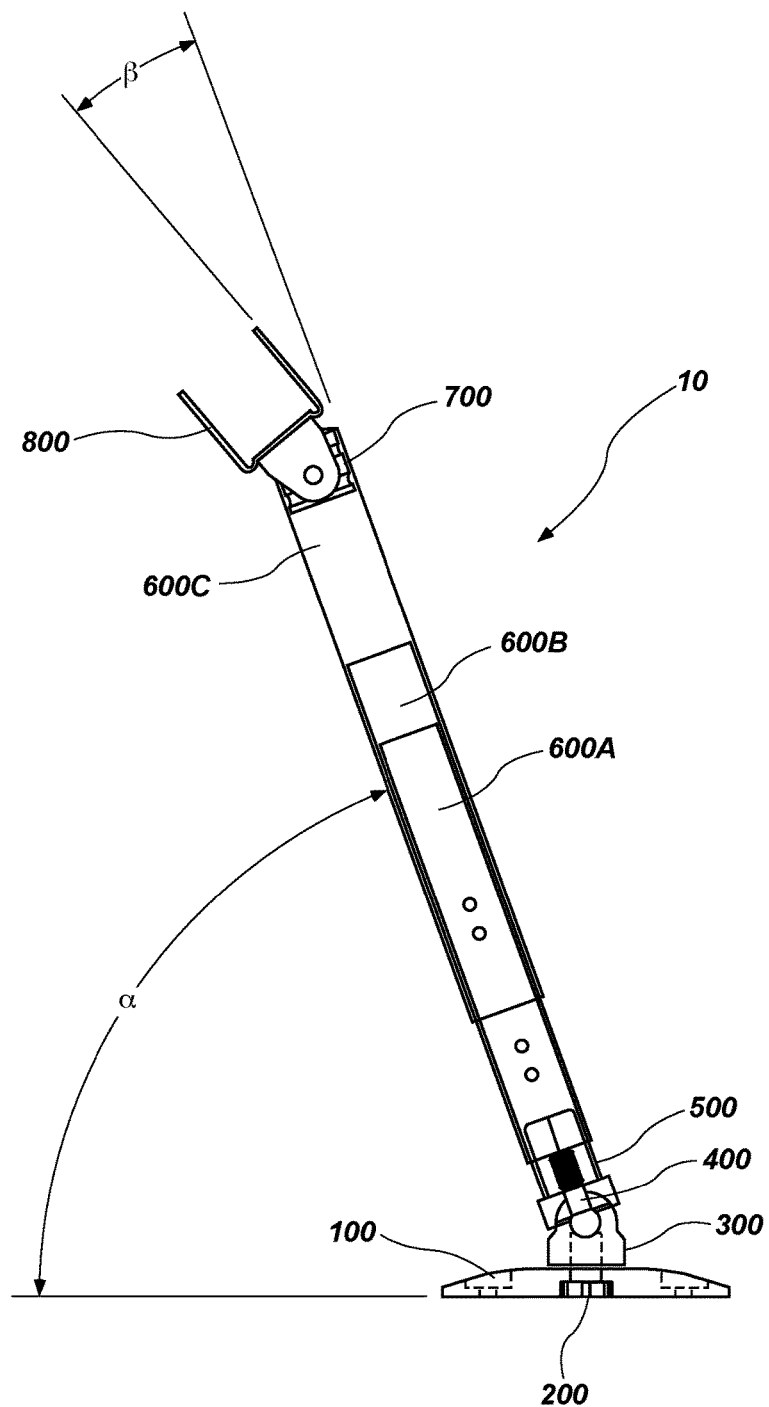
FIG. 8 is a top perspective view of the components of FIGS. 1, 2A-2C and 3A-7 illustrating the position of these to one another.

FIG. 8 depicts the relationship between the base 100, upper and lower knuckle members 200 and 500, and the ball stud 400 following installation. Once the radius bolt 200 is seated in the base 100, the base may then be attached to the roof. This may be accomplished by placement of a lag screw or bolt through the attachment recesses into the roof. One or more of the connectors are preferably secured into a supporting beam or truss of the building structure.

As depicted in FIG. 1, after the base 100 is secured to the roof R, any roofing membranes M may be placed over the base with only the radius bolt 200 stem passing therethrough. While the depicted sections of membrane are smaller for illustration, it will be appreciated that the sections used in a typical installation extend beyond the base 100 for a sufficient distance to be sealed to the preexisting roofing material. This sealing may be performed as known in the art, using suitable adhesives, sealants, or heat. A suitable sealant, such as a silicone caulk may then be disposed around the radius bolt and membrane opening to seal this junction upon securing as discussed below.

The ball stud 400 is then placed with the ball portion in the concave inset of the radius bolt and the stem passed through the lower knuckle member 300. The upper knuckle member 500 is then threadably attached to the stem portion of the ball stud 400. The upper knuckle member 500 and any attached tubes 600 may then be adjusted to a desired angle with respect to the base 100. For example, where the base 100 is placed on an angled portion of a roof, the tubes 600 may be adjusted to a generally plumb position. This may be accomplished using a plumb level. A specialized plumb level using a "bulls-eye" level placed atop a body with an angled recess for placement on a tube may be used, although it will be appreciated that any suitable plumb level may be used.

It will be appreciated that the ball stud rotating in the lower knuckle atop the radius bolt acts as a ball joint and the curved upper and lower surfaces of the lower and upper knuckles each act as a separate ball joint that moves in tandem forming a compound ball joint. As shown in FIG. 8, the telescoping pole 602 may be moved to an angle α of up to about 70 degrees from a vertical axis at the center of the base 100 in any direction, using the compound ball joint.

With the tube 600 and/or upper knuckle member held at a desired angle, the ball stud may be secured in the desired position. This can be accomplished by threading the lower knuckle member 200 on the radius bolt to compress the ball stud 400 ball portion against the curved upper portion of the internal sidewall of the lower knuckle member. Setscrews may then be placed in the securing openings 308 to contact the ball stud with additional compression for a second securing. Then the upper knuckle 500 may be threaded down the stem portion of the ball stud 400 until the curved upper surface 312 of the lower knuckle and the curved lower surface 512 of the upper knuckle are compressed together for further securing.

Figure 2D:
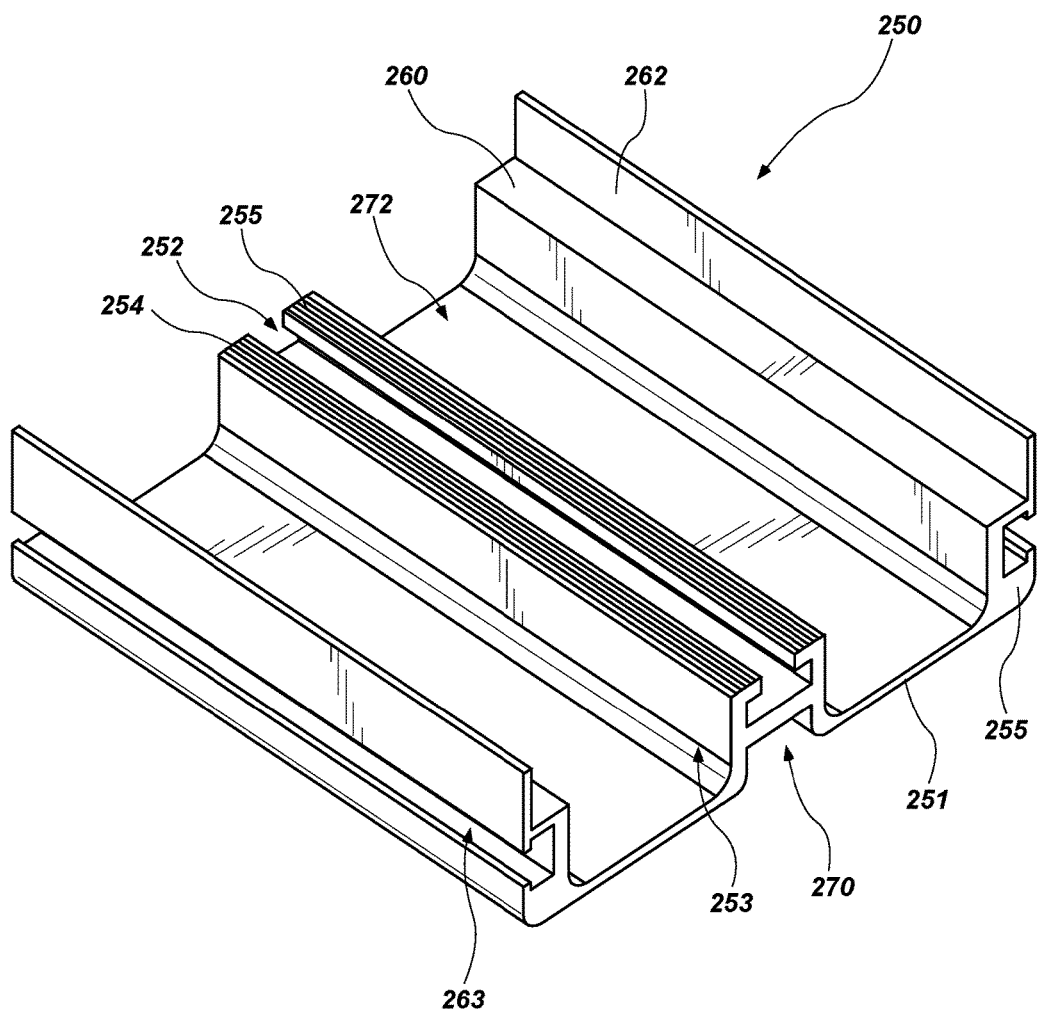
FIG. 2D is a perspective view of a second embodiment of a base for installing a system in accordance with the present disclosure.

Returning to FIGS. 2D and 2E, one suitable embodiment of an alternative base 250 is illustrated. As depicted, base 250 is not secured directly to a roof R, but is designed to rest thereon. The base 250 has a generally planar bottom surface 251 for placement on a roof. One or more lower channels 270 may be preset to allow for placement over roof seals or attachment to underlying structures, where applicable. The bottom surface 251 may have a layer of a resilient material, such as rubber or vinyl, or resilient feet disposed thereon to protect an underlying surface on which the base 250 is placed.

A central ridge 253 lies along a long axis of the base 250 and contains a central slot 252. As depicted, the central slot 252 may be formed by two generally T-shaped (or generally L-shaped) member 254 to create a slot with an overhanging lip on either side open at a generally planar surface. The upper surface of each member 254 may be roughened, knurled, or include a series of ridges 255 to help "lock" a fastener thereto as discussed further herein.

On either side of the central ridge 253, a channel 272 may be formed, at the other end of which a generally vertical sidewall 255 rises to an outer ridge, that may have a generally L-shaped upper end with a generally horizontal portion 260 that is coplanar with the top of the central ridge 253 and an outer vertical sidewall 262. Channels may be disposed in the outer surface of the sidewall 255 for connection to solar panel related wiring or controls.

For use in one illustrative embodiment, a base 250 may be placed on a roof R at a desired location and a radius bolt 200 having an appropriately sized head positioned with the head secured in the central slot 252, underlying the members 254, as by slidable insertion from an end. A ball stud 400 and lower knuckle member 300 may then be threaded on the radius bolt 200. As the lower knuckle member is tightened on the radius bolt, as discussed previously herein, the members 254 are compressed between the head of the radius bolt and the bottom of the lower knuckle member for securing. The ridges 255 help retain the lower knuckle member 300 in the secured position. Weight may be added to the base 250 to maintain the base in a desired position on a roof R. For example, concrete blocks may be placed on the top of the central ridge 253 extending to the sidewall horizontal portion 260. This can leave the channels 272 open for flow of runoff or placement of wiring and cables. Where suitable, bases of suitable length for placement of multiple radius bolts for multiple support assemblies may be used.

Figure 2E:
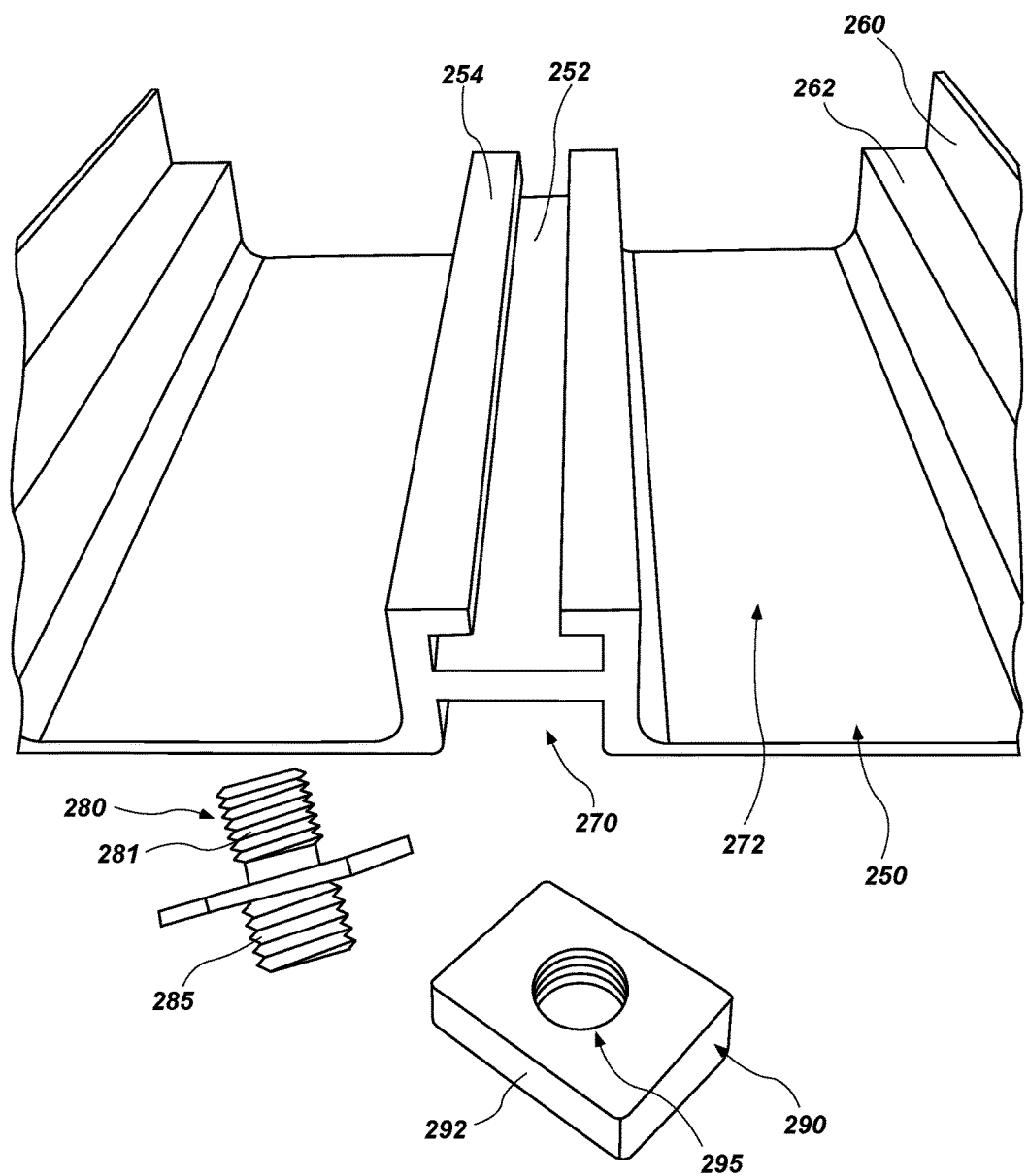
FIG. 2E is a front perspective view of the base of FIG. 2D with an embodiment of radius bolt and connector for use therewith.
Figure 5A:
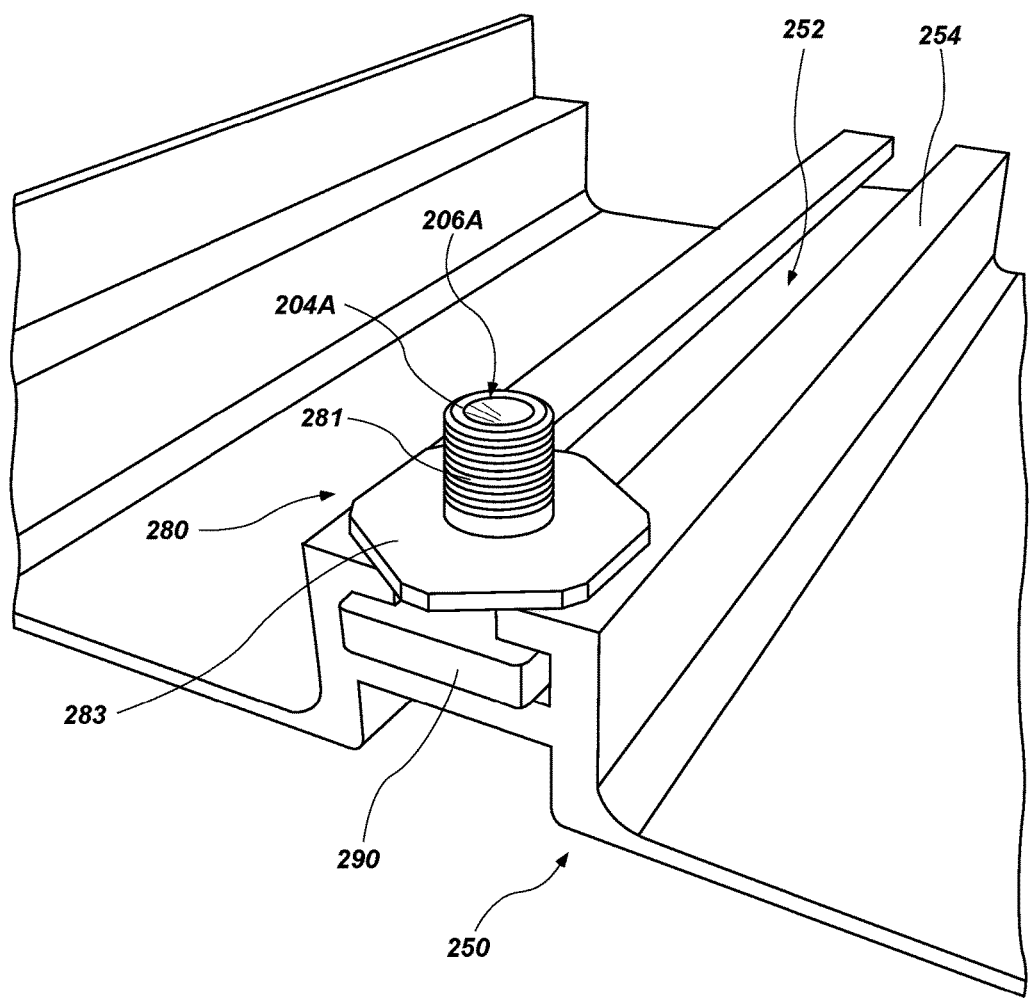
FIG. 5A is a perspective view of the components of FIG. 2E illustrating the position of these to one another for an installation.

As depicted in FIGS. 2E and 5A, a connector 290 having a body 292 configured for slidable insertion in the central slot 252, such as the depicted rectangular body, which is sized and shaped for slidable insertion in the central slot 252 to reside therein underlying the members 254. A threaded opening 295 passes through the body 292 for attachment to a radius bolt or other portion of the system. A second embodiment of a radius bolt 280 for use with the connector 290 is also depicted. Radius bolt 280 has a lower threaded shaft 285 for connection to the connector 290; and an upper threaded shaft 281, having an upper face 204A which may be generally flat with a concave inset 206A formed similar to that of radius bolt 200 previously discussed. The upper threaded shaft 281 and lower threaded shaft 285 may be separated by a central planar portion 283 that may be disposed generally orthogonal to a long axis of the shafts. As depicted, the shafts may be differently threaded or sized to facilitate correct placement during installation and the central planar portion 283 may have polygonal shape to facilitate tightening with a wrench.

For use with the embodiment of FIGS. 2E and 5A, the base 250 may be placed on a roof R at a desired location and a connector 290 positioned in the central slot 252, underlying the members 254, as by slidable insertion from an end. A radius bolt 280 may then be threaded into the connector 290 opening 292 and secured therein, with the members 254 compressed between the connector 290 and central planar portion 283 of the radius bolt. The ridges 255 help retain the central planar portion 283 of the radius bolt in the secured position. A ball stud 400 and lower knuckle member 300 may then be threaded on the upper threaded shaft 281 of the radius bolt 280. Weight may be added to the base 250 to maintain the base in a desired position on a roof R. For example, concrete blocks may be placed on the top of the central ridge 253 extending to the sidewall horizontal portion 260. This can leave the channels 272 open for flow of runoff or placement of wiring and cables. Where suitable, bases of suitable length for placement of multiple radius bolts for multiple support assemblies may be used.

As depicted in FIG. 1, a tube 600A is secured to the upper knuckle member 500, which may be by crimping thereto, or as otherwise known in the art. As depicted in FIG. 1, in a preferred embodiment, there are multiple tubes, such as those depicted at 600A, 600B and 600C of varying diameters to form a telescoping pole 602. It will be appreciated that although three tubes 600 are depicted that any desired number may be used, as may be appropriate for a particular installation. Additionally, although round tubing is depicted, that tubing of other cross-sectional shapes, such as square, oblong, rectangular, oval, or others may be used. For use, the telescoping pole 602 is adjusted to a desired height and the tube 600 secured to one another. In the depicted embodiments, this is done by the screws 604. It will be appreciated that other securing structures may be used.

Further, in the depicted embodiment, the tubing 600 is sized for a close fit between adjacent sections, with the diameter gradually increasing from each lower tube to the next higher tube. This positions the gaps at the joints between adjacent tubes facing downwards, reducing potential runoff from entering the pole 602.

Figure 9:
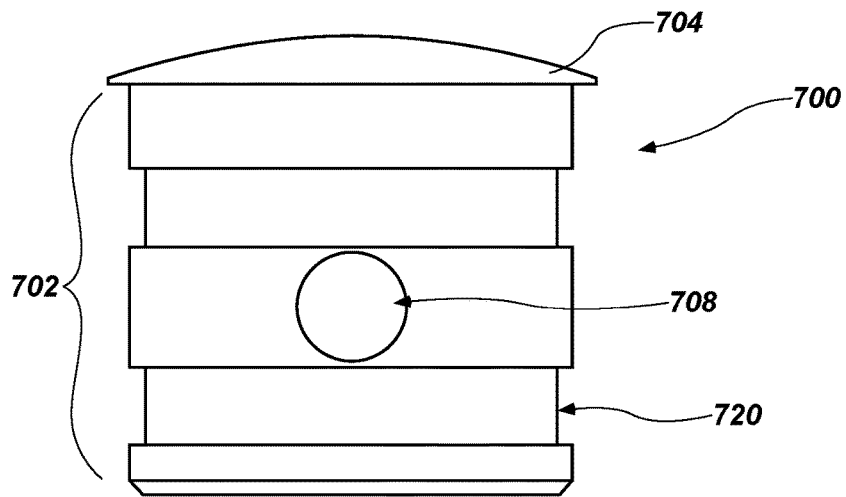
FIG. 9 is a sectional side view of an upper end cap for installing the system of FIG. 1.

At the top end of the telescoping pole 602, an upper end cap or plug 700 is inserted in the tube 600. Upper end cap 700 is depicted in isolation in FIG. 9 and may be formed as a unitary member with a lower narrower portion 702 and an upper domed portion 704. The upper domed portion 704 may be rounded to facilitate runoff and may have an encircling rim that covers the upper portion edge of a tube 600 wall upon insertion. The lower narrower portion 702 is spaced and sized for insertion in the tube 600 at an upper end of telescoping pole 602 and may include features for attachment to a tube 600. In the depicted embodiment, these are the encircling recesses 720 allowing the tube to be crimped over the narrower lower portion of the plug member 700.

The lower narrower portion 702 may also include a bolt hole 708 formed as a hole passing therethrough in which a bolt or rod may be inserted. This allows for a connection at the top of the telescoping pole that is reinforced by the solid body of the upper plug.

Figure 10:
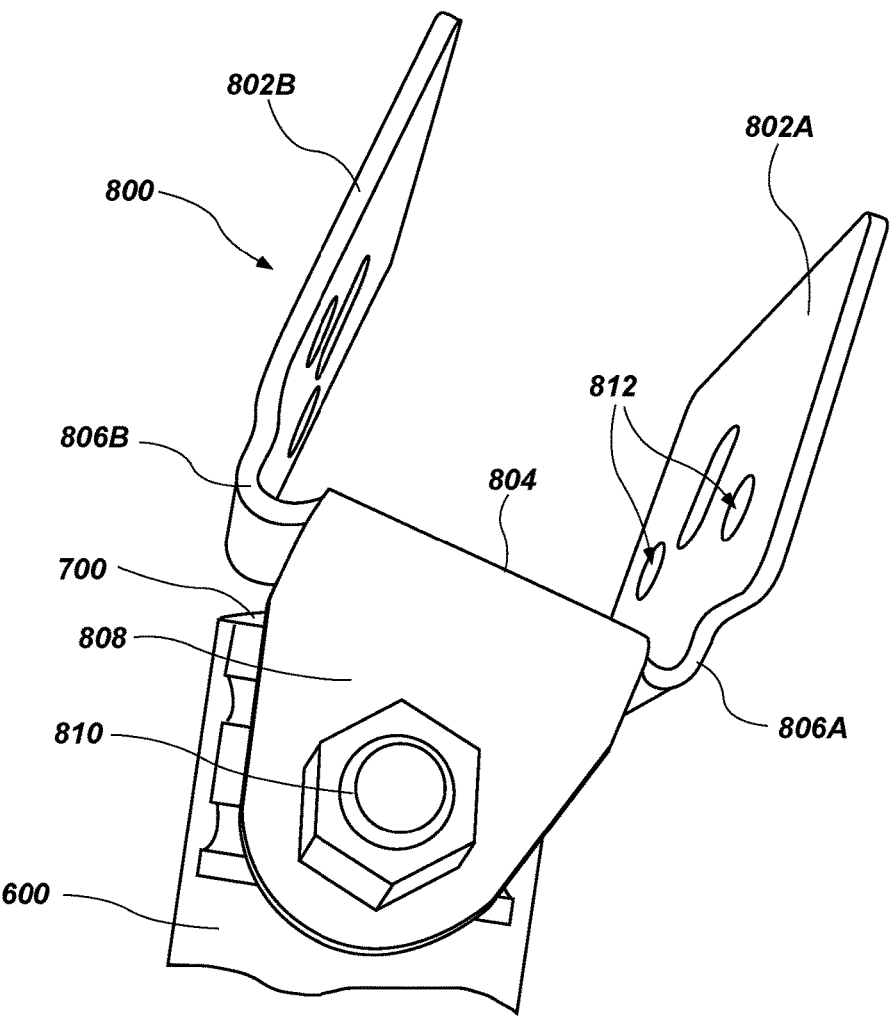
FIG. 10 is a side view of an upper bracket for installing the system of FIG. 1.

As shown in FIGS. 1 and 8, a bracket 800 is disposed at the top of the telescoping pole 602. The bracket is depicted in more detail in FIG. 10. As depicted, the bracket includes a generally planar portion 804 that serves as a seat. At two opposite sides, downwardly extending flanges 808 contain openings 810 for a bolt. The bracket 800 may be secured to the top of the telescoping pole 602 by alignment of the opening 810 with the bolt hole 708 in the upper end plug 700 (and corresponding openings in the sidewall of the uppermost tube 600 of the telescoping pole 602) and the placement of a bolt or rod 820 therethrough which may then be secured, as by a threaded nut. The bracket 800 may rotate with respect to the pole up to an angle β of about 20 degrees, as shown in FIG. 8, which is determined by the position of the bolt and the curve of the domed upper surface of the upper end cap 700.

On other opposite sides of the seat 804, two upwardly extending bracket flanges 802A and 802B extend as generally parallel planar members defining a channel there between. Each bracket flange 802 includes features for connecting to a rail, such as the depicted connection openings allowing a screw or bolt to be placed therethrough and may also contain a larger opening for placement of cable.

Each bracket flange 802 is connected to the seat 804 by a curved neck portion 806A or 806B. As depicted, the neck portions may be curved outward from the generally right angle between the seat 804 and flange 802 to allow for a larger rail corner to be placed therein. It will be appreciated that the bracket 900 may be formed as a stamped piece of flat metal that is then bent to the desired shape.

Figure 11:
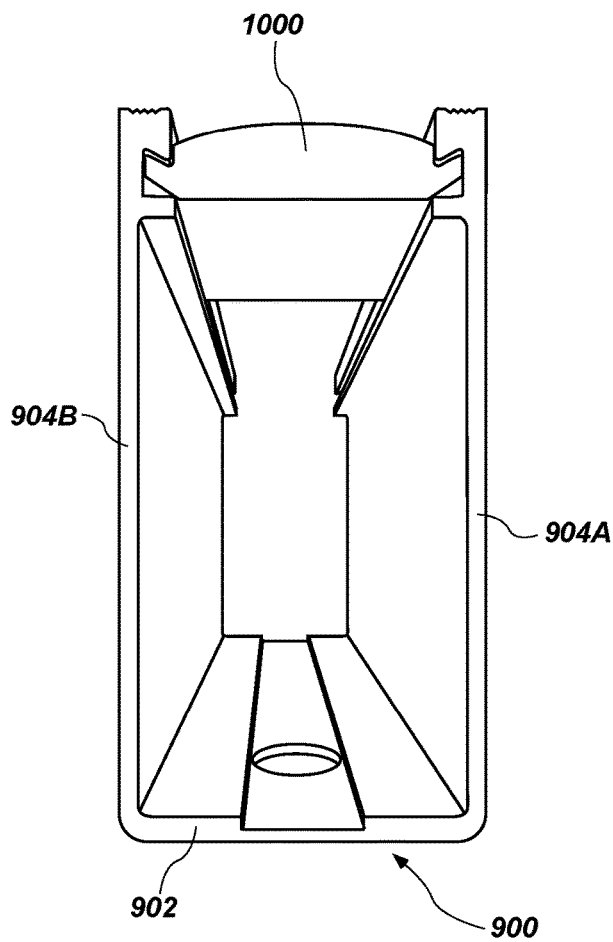
FIGS. 11 and 11A are side and sectional side views of two rails for use with the system of FIG. 1.
Figure 11A:
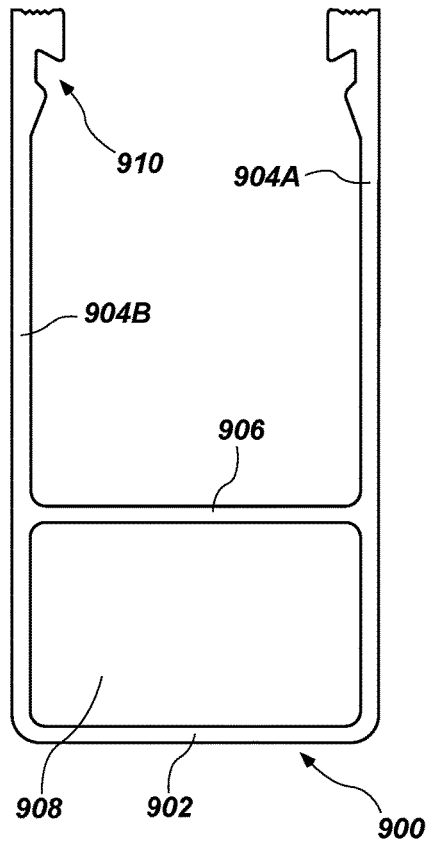

A rail 900 may be placed in the bracket 800 and secured therein, as by screws. A commercially available rail 900 is depicted in FIG. 1, similar rails are available from PROSOLAR, QUICKMOUNT and UNIRAC. A novel rail 900A assembly is depicted in FIG. 11. Each is formed as a generally U shaped channel with a floor 902 and two opposing sides 904A and 904B. In the depicted embodiments, each side has a connection channel 910 formed therein for attachment to an inserted fitting 1000. It will be appreciated that other fittings may be used and other rail structures that can be attached to the brackets 800 and solar panels may be used. As depicted in the FIG. 11, an intermediate medial member 906 may divide the U shaped channel to create a lower passage 908 separated from the upper channel. This allows the screws securing the rail 900 to the bracket 800 to reside within the passage 908. Wiring for the solar panel assembly can then be drawn through the upper portion of the rail without potential damage from the ends of the screws.

Figure 12:
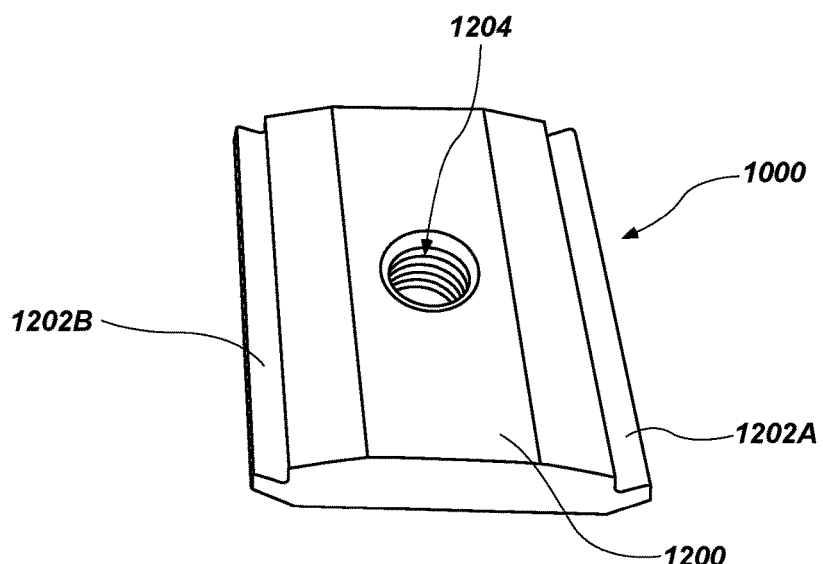
FIG. 12 is a top view of a rail fitting for use with the system of FIG. 1.

FIG. 12 depicts a rail fitting 1000 for placement in the rail. As shown, the rail fitting 1000 may be formed as body 1200 with two parallel side flanges 1202A and 1202B along the longitudinal side edges and that are shaped to correspond to the connection channels 910 of the rail 900. It will be appreciated that the angle and shape of the side flanges and connection channel may vary in differing embodiments. A connection feature such as a threaded hole 1204 is disposed in the body 1200 and allows for connection to the solar panel. It will be appreciated that other connection features, such as a non-threaded hole or threaded or non threaded stud mounted on the fitting 1000 may be used in differing embodiments. The rail fitting 100 may be inserted in the rail and adjusted to the desired position and then a solar panel may be attached thereto.

For installation of solar panels using the system of the present disclosure, a series of bases 100 or 250 may be placed on the roof in the appropriate positions, such as in rows of suitable spacing for securing to beams and for supporting the solar panels that are selected for installation. Radius bolts 200 may be installed and the bases 100 or 250 may be secured to the roof as discussed previously herein, and where appropriate, sealed using membrane M.

A ball stud 400, lower knuckle 300, and upper knuckle 500 with attached telescoping pole 602 may then be attached to each radius bolt 200 on each base. A laser level may then be used to mark the appropriate height for the telescoping pole assemblies 602. Typically, two heights are marked, one for a lower set at a first edge of each row of solar panel assemblies, and one higher for the second edge to maintain the desired angle of the panels. Using a plumb level as discussed previously herein, the telescoping poles 602 are moved to a plumb position and the compound ball joint of the radius bolt 200, ball stud 400 and knuckle assemblies 300 and 500 are secured. The telescoping poles are then adjusted to the desired heights and secured thereat.

Typically, the upper end cap 700 and bracket 800 will be attached to the topmost tubes 600 of the telescoping pole assembly 602 prior to arrival at the job site, but if necessary, may be attached thereat. The rails 900 are secured in the brackets 800 and, where a rail fitting 100 is used, these are then installed. The solar panels are then attached to the rails and suitable wiring can be performed.

The use of the modular adjustable components of the present system, allows a commercial roof installation to be performed in a single session, without the need for additional customization of non-adjustable parts. Applicant has found a two person crew can install this system with the panels on a typical commercial building in one work day, where other systems have required multiple visits. This can achieve overall costs savings on the installation due to savings on labor and time, despite the increased costs of the system components.

It will be appreciated that the various components may be constructed of materials of suitable strength that possess the necessary properties for withstanding the adverse weather conditions found on rooftops. Stainless steel alloys and anodized aluminum alloys, as well as any other suitable materials can be used.

While this disclosure has been described using certain embodiments, it can be further modified while keeping within its spirit and scope. This application is therefore intended to cover any variations, uses, or adaptations of the disclosure using its general principles. Further, this application is intended to cover such departures from the present disclosure as come within known or customary practices in the art to which it pertains and which fall within the limits of the appended claims.

What is claimed is:

1. An adjustable mounting system, comprising:
    a base for securing to a roof; and
    a compound ball joint comprising
        a first bolt for attachment to the base, such that a shaft of the first bolt extends above the base to a top face with a concave portion,
        a ball stud having a spherical head portion for articulating in the concave portion of the top face and a threaded shaft, and
        a first lower knuckle member comprising a body having a generally curved upper end and a central passage passing from a bottom opening at a lower surface to a top opening, such that when the lower knuckle member is installed with the first bolt located in a lower portion of the central passage and an articulated ball stud disposed on an upper portion of the central passage, the spherical head of the ball stud is compressed against the upper face of the first bolt with the threaded shaft of the ball stud protruding through the top opening.

2. The adjustable mounting system of claim 1, wherein the lower knuckle member top opening has a generally conical shape passing to the central passage to allow the threaded shaft of the ball stud to be maintained at a desired angle.

3. The adjustable mounting system of claim 1, further comprising a first upper knuckle member, the upper knuckle member having center passage extending from a bottom opening towards a top end, an upper portion of the central passage threaded for attachment to the threaded shaft of the ball stud and a lower portion of the central passage at the bottom opening having a curved sidewall corresponding to the generally curved upper end of the lower knuckle member; such that when the first upper knuckle member is threadably secured on the ball stud, the curved sidewall compresses against the generally curved upper end of the lower knuckle member to maintain the compound ball joint at a desired angle.

4. The adjustable mounting system of claim 3, further comprising an adjustable leg comprising a telescoping portion attached to the first upper knuckle member.

5. The adjustable mounting system of claim 1, wherein the base for securing to a roof comprises a generally disk-shaped member that can be secured to a roof, the disk shaped member having a bolt hole passing therethrough to secure the first bolt therein.

6. The adjustable mounting system of claim 5, wherein the bolt hole comprises a seat accessible on a lower surface of the base for retaining the head of the first bolt therein.

7. The adjustable mounting system of claim 1, wherein the base for securing to a roof comprises
   an elongated member having a generally planar bottom surface,
   a central ridge rising along a long axis of the elongated member and containing a central slot with two overlying planar members to define an overhanging lip on either side of the central slot with generally planar surfaces in a common plane,
   an opposite channel formed on either side of the central ridge, each opposite channel defined by a generally vertical end wall parallel to the central ridge and rising to an outer ridge with a generally horizontal portion that is coplanar with the top of the central ridge.

8. The adjustable mounting system of claim 7, further comprising a connector for slidable insertion into the central slot and defining a bolt opening for connecting to the first bolt with the overhanging lip on either side of the central slot compressed between the connector and a planar portion of the first bolt.

9. The adjustable mounting system of claim 1, further comprising an angularly adjustable bracket disposed at an upper end of the adjustable leg for connection to a rail for supporting the solar panel.

10. The adjustable mounting system of claim 1, further comprising:
    at least a second adjustable leg comprising a telescoping portion;
    at least a second compound ball joint for maintaining the at least second adjustable leg at a desired angle;
    and at least a first rail for connection to solar panel supported by the adjustable leg and at least a second adjustable leg.

11. An adjustable mounting system for solar panels, comprising:
    at least a first base for securing to a roof;
    at least a first leg; and
    at least a first compound ball joint for connecting the at least a first leg to the at least a first base at a desired angle, comprising
      a first bolt for attachment to the at least a first base, such that a shaft of the first bolt extends above the base to a top face with a concave portion,
      a ball stud having a spherical head portion for articulating in the concave portion of the top face and a threaded shaft, and
      a first lower knuckle member, the lower knuckle member comprising a body having a generally curved upper end and a central passage passing from a bottom opening at a lower surface to a top opening, such that when the lower knuckle member is installed with the first bolt located in a lower portion of the central passage and an articulated ball stud disposed on an upper portion of the central passage, the spherical head of the ball stud is compressed against the upper face of the first bolt with the threaded shaft of the ball stud protruding through the top opening.

12. The adjustable mounting system of claim 11, further comprising a first upper knuckle member, the upper knuckle member having center passage extending from a bottom opening towards a top end, an upper portion of the central passage threaded for attachment to the threaded shaft of the ball stud and a lower portion of the central passage at the bottom opening having a curved sidewall corresponding to the generally curved upper end of the lower knuckle member; such that when the first upper knuckle member is threadably secured on the ball stud, the curved sidewall compresses against the generally curved upper end of the lower knuckle member to maintain the compound ball joint at a desired angle.

13. The adjustable mounting system of claim 12, wherein the at least a first leg is attached to the first upper knuckle member.

14. The adjustable mounting system of claim 11, wherein the at least a first leg comprises telescoping sections that can be secured to one another to adjust the length of the at least a first leg.

15. The adjustable mounting system of claim 11, further comprising an angularly adjustable bracket disposed at an upper end of the at least a first leg for connection to a rail for supporting the solar panel.

16. The adjustable mounting system of claim 11, wherein the at least a first base for securing to a roof comprises a puck for attachment to a roof or an elongated member with a flat bottom for placement on a roof, the elongated member defining a ballast receiving area and drainage channels accessible at its upper surface.

17. A compound ball joint for an adjustable mounting system, comprising:
    a first bolt for attachment to a base, such that a shaft of the first bolt extends above the base to a top face with a concave portion,
    a ball stud having a spherical head portion for articulating in the concave portion of the top face and a threaded shaft, and
    a lower knuckle member comprising a body having a generally curved upper end and a central passage passing from a bottom opening at a lower surface to a top opening, such that when the lower knuckle member is installed with the first bolt located in a lower portion of the central passage and an articulated ball stud disposed on an upper portion of the central passage, the spherical head of the ball stud is compressed against the upper face of the first bolt with the threaded shaft of the ball stud protruding through the top opening.

18. The compound ball joint of claim 17, further comprising an upper knuckle member having a center passage extending from a bottom opening towards a top end, an upper portion of the central passage threaded for attachment to the threaded shaft of the ball stud and a lower portion of the central passage at the bottom opening having a curved sidewall corresponding to the generally curved upper end of the lower knuckle member; such that when the first upper knuckle member is threadably secured on the ball stud, the curved sidewall compresses against the generally curved upper end of the lower knuckle member to maintain the compound ball joint at a desired angle.

19. The compound ball joint of claim 17, wherein the upper knuckle member further comprises a leg extending therefrom for supporting a mounting system.

* * * * *